United States Patent [19]

Fukuta et al.

[11] 4,229,397
[45] Oct. 21, 1980

[54] METHOD FOR FORMING FIBER-REINFORCED COMPOSITE MATERIAL

[75] Inventors: Kenji Fukuta, Yokohama; Ryuzo Ono-Oka, Kanagawa; Masatoshi Yoshida; Kazuhisa Saito, both of Mishima; Hiroyuki Kosuda, Numazu, all of Japan

[73] Assignees: Agency of Industrial Science & Technology; Toho Beslon Co., Ltd., both of Tokyo, Japan

[21] Appl. No.: 859,634

[22] Filed: Dec. 12, 1977

[30] Foreign Application Priority Data

Dec. 10, 1976 [JP] Japan ................................ 51-148561

[51] Int. Cl.³ .............................................. D04H 1/16
[52] U.S. Cl. ...................................... 264/113; 264/114; 264/115; 264/121; 264/122
[58] Field of Search ............... 264/113, 115, 122, 114, 264/121

[56] References Cited

U.S. PATENT DOCUMENTS

| 3,010,161 | 11/1961 | Duvall | 264/115 |
| 3,328,383 | 6/1967 | Roscher et al. | 264/115 |
| 3,928,693 | 12/1975 | Rudloff | 264/122 |

Primary Examiner—Donald J. Arnold
Assistant Examiner—James R. Hall
Attorney, Agent, or Firm—Sughrue, Rothwell, Mion, Zinn and Macpeak

[57] ABSTRACT

A method for forming a uniformly mixed fibrous mat which comprises feeding a continuous high tensile modulus reinforcing fibrous material and a pre-cut thermoplastic fibrous material with a lower melting point or softening point than the temperature at which the reinforcing fibrous material melts or is damaged to a rotating rotor which is provided with projections to thereby cut the continuous fibrous material and pluck the pre-cut fibrous material, dispersing the thus treated fibrous materials into an air flow to mix the same and thereafter collecting the resulting mixed materials on a net to yield the mat. The product can thereafter optionally be compressed under heat to melt only the thermoplastic fibrous material to thereby consolidate the mat.

26 Claims, 2 Drawing Figures

METHOD FOR FORMING FIBER-REINFORCED COMPOSITE MATERIAL

BACKGROUND OF THE INVENTION

1. Field of the Invention

The present invention relates to a method for forming a fiber-reinforced composite material and, if desired, molding the same.

2. Description of the Prior Art

Known techniques for producing fiber-reinforced composite materials containing a thermoplastic resin as a matrix by compression molding include, for example, (a) a method which comprises melting a resin using an extruder or the like, mixing the resin with reinforcing fibers, pre-molding the mixture into pellets, and then compression-molding the pellets in a mold (as disclosed, for example, in British Pat. No. 1,268,755), (b) a method which comprises placing a mixture of a powdery or pelletized polymer and a reinforcing fibrous material in a mold, and compression-molding the mixture (as disclosed, for example, in *Polymer Engineering and Science* Vo. 3 No. 6, p. 455–461, (November 1973)), and (c) a method which comprises mixing a reinforcing fibrous material and a powdery polymer utilizing an air flow, collecting the mixture on a net to form a mat, and molding the mat under heat and pressure (as disclosed, for example, in Japanese Patent Publication No. 44148/76).

These prior methods, however, present one or more difficulties. According to method (a), the fibers are cut to very short lengths during the mixing, and therefore, cannot fully exhibit a reinforcing effect. With method (b), it is difficult to mix the fibers uniformly with the polymer. Even if uniform mixing can be achieved, the components tend to separate before molding, and the uniformity of the molded product is not satisfactory. According to method (c), the powdery polymer often passes through the mesh of the collecting net, or the mixed powdery polymer tends to separate before molding, as is the case with method (b).

SUMMARY OF THE INVENTION

An object of this invention is to provide process for forming a mat which can be formed into a fiber reinforced composite material having a high modulus of elasticity by compression under heat without adding another resin.

Another object of this invention is to provide process for forming a mat which can be readily formed into a fiber-reinforced composite material of high performance having a reinforcing fibrous material uniformly dispersed therein.

Still another object of this invention is to provide process for forming an easy-to-handle mat for production of a fiber-reinforced composite material.

A further object of this invention is to provide a method for producing a fiber-reinforced composite material having a high modulus of elasticity using the above-described mat.

In one embodiment of this invention, the invention provides process for forming a mixed fibrous mat for the production of a fiber-reinforced composite material, which comprises a reinforcing fibrous material and a thermoplastic fibrous matrix polymer having a lower melting point than the reinforcing fibrous material.

In another embodiment, the invention provides a method for producing a high flexural modulus fiber-reinforced composite material, which comprises consolidating the mat under pressure and heat to melt only the matrix polymer.

BRIEF DESCRIPTION OF THE ACCOMPANYING DRAWINGS

DETAILED DESCRIPTION OF THE INVENTION

Figure 1:
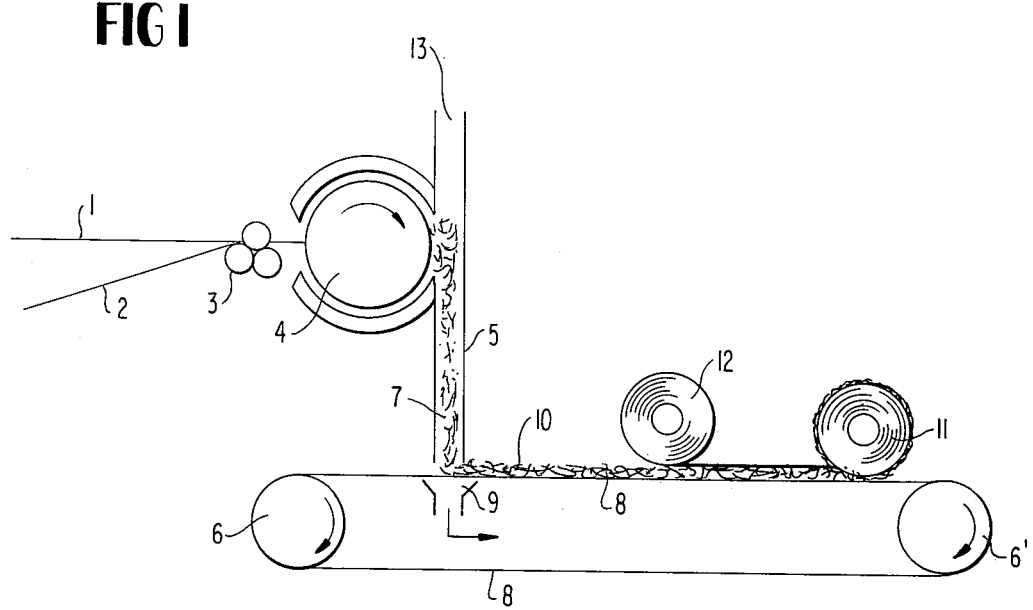
FIG. 1 shows an apparatus for producing the mat of this invention according to one embodiment of the method of this invention.

The term "reinforcing fibrous material", as used in the present application, denotes fibers which reinforce a molded article while retaining their fibrous form in the molded article even after molding.

The reinforcing fibrous material comprises fibers preferably having a tensile modulus of at least about 5 t/mm$^2$. If the tensile modulus is less than about 5 t/mm$^2$, the composite material obtained does not have a sufficient modulus of elasticity, and the effect of forming the composite material is reduced. The upper limit of the tensile modulus is not limiting but generally the tensile modulus will range up to about 60 t/mm$^2$.

Examples of suitable reinforcing fibrous materials which can be used in this invention include carbon fibers (including graphite fibers), inorganic fibers such as glass fibers, aluminum oxide fibers, silicon carbide fibers or boron fibers, metallic fibers such as stainless steel fibers, and aromatic polyamide fibers such as an aromatic polyamide comprising the condensation product of p-phenylenediamine with terephthalic acid, or of p-aminobenzoic acid, commercially available, for example, under the trademark KEVLAR (Du Pont) (as disclosed, for example in Japanese Patent Publication No. 2489/1972 corresponding to U.S. patent application Ser. No. 693,739 filed on Dec. 27, 1967).

The term "thermoplastic fibrous matrix polymer" as used herein means a fibrous polymer which melts at the time of molding and forms a matrix of the molded product. This polymer may be any thermoplastic fiber-forming polymer which melts or softens at a lower temperature than the temperature at which the reinforcing fibrous material used in this invention melts or is damaged. Suitable thermoplastic polymers are those having a melting point which is generally at least about 5° C., preferably at least about 10° C., more preferably at least about 50° C., lower than the melting point of the reinforcing fibrous material although this depends upon the accuracy of temperature control of and the temperature distribution in the molding machine. Examples of specific thermoplastic polymers which can be used include nylons (e.g., nylon-6 having a melting point of about 215° C. to about 220° C., nylon-6,6 having a melting point of about 250° C. to about 260° C.), polyesters (e.g., a polyester comprising the condensation product of terephthalic acid or a mixture of terephthalic acid and isophthalic acid with ethylene glycol and having a melting point of about 250° C. to about 260° C.), polypropylenes having a melting point of about 165° C. to about 175° C., polyethylenes having a melting point of about 110° C. to about 135° C., and polystyrenes having a softening point of about 100° C. to about 120° C. These polymers do not need to be in the fibrous form from the outset, and for example, they may be split fibers (as described, for example, in U.S. Pat. Nos. 2,185,789 and 3,214,899).

While the diameters of the fibers of the reinforcing fibrous material and the fibers of the thermoplastic fibrous matrix polymer are not particularly limited, they generally range from about 1 micron to about 100 microns. From the standpoint of handling properties, that is, strength of the fibrous mat, at least one of the two types of fibers preferably has a fiber length of at least about 5 mm, more preferably at least about 10 mm. The length of the reinforcing fibers is preferably at least about 1 mm, more preferably at least about 10 mm, from the standpoint of the strength of the fiber-reinforced molded product. The matrix fibers desirably have the same fiber length as described above in order to retain the strength of the fibrous mat before molding. For insuring uniform mixing, the upper limits of the fiber lengths of the two types of the fibers should be preferably about 100 mm, more preferably about 50 mm.

There is no particular limitation on the combination of the reinforcing fibrous material with the thermoplastic fibrous matrix polymer. Especially superior combinations from the standpoint of strength are those of fibrous matrix polymers which will provide molded articles (which consists of this polymer alone) having a high modulus of elasticity and reinforcing fibers having a high modulus of elasticity, for example a combination of a nylon or a polyester with carbon fibers.

Preferably, about 1 to about 60% by weight of the reinforcing fibrous material and about 99 to about 40% by weight of the thermoplastic fibrous matrix polymer are employed. If the proportion of the reinforcing fibrous material is less than about 1% by weight, sufficient improvement in the properties of the composite material prepared from the resulting mixed mat is not obtained. If the proportion of the reinforcing fibrous material is more than about 60% by weight, the spaces among the fibers of the reinforcing fibrous material are not completely filled by the thermoplastic fibrous matrix polymer during compression molding under heat. Consequently, pores will remain in the molded article and the properties of the molded article deteriorate. A more preferred proportion is about 5 to about 50% by weight for the reinforcing fibrous material and about 95% to about 5% by weight for the thermoplastic fibrous matrix polymer. If desired, each of the reinforcing fibrous material and the thermoplastic fibrous matrix polymer may be a mixture of two or more kinds of materials.

The mixed fibrous mat of this invention may be produced using any desired method, for example, (1) a method which involves dispersing cut fibers of the fibrous matrix polymer and the reinforcing fibrous material in a gaseous medium such as air or a liquid medium such as water, and collecting the fibers into a mat form using a net, or (2) a method which comprises plucking and cutting continuous fiber yarns or tows, or slivers or a web of short fibers etc. of the fibrous matrix polymer and the reinforcing fibrous material using a device, for example, a needle-fitted rotor or a carding cloth, and collecting the cut fibers on a net using an air flow to form a web (as disclosed, for example, in U.S. Pat. No. 3,894,315).

It is important in the present invention to produce the mat in which the reinforcing fibrous material and the thermoplastic fibrous matrix polymer are mixed as uniformly as possible. On the other hand, when the length of the fibers becomes longer, it becomes more difficult to mix them uniformly. However, the inventors found that it is possible to produce a uniformly mixed mat from longer fibrous materials using method (2). It is preferably to produce the mixed mat using method (2).

The production of the mixed fibrous mat is described below with reference to the drawings which show an apparatus for producing a mat by method (2).

Referring now to the drawings, a reinforcing fibrous material 1 and a thermoplastic fibrous matrix polymer 2 are fed to a needle-equipped rotor 4 rotating at a high speed, by means of feed rollers 3. When these materials are continuous fibers, they are pulled and cut by the rotor 4.

Preferably, at least one of these two types of fibers 1 and 2, especially the thermoplastic fibrous matrix polymer 2, should be fed in a pre-cut state to the rotor 4. The length of pre-cut fiber is about 1 to 100 mm. This is because the reinforcing fibrous material 1 has a lower ultimate elongation than the thermoplastic fibrous matrix polymer 2 and thus is more susceptible to cutting to extremely short fibers if both types of fibers are processed under the same conditions; the fibrous reinforcing material 1 in a composite material prepared from the mixed mat should preferably have as long a fiber length as possible; and fibers of thermoplastic polymers generally have good flexibility and thus lend themselves to easy processing into a lap, slivers, etc. and handling, and therefore are suitable for supplying as a lap, slivers, etc. after cutting.

The fibers fed to the rotor and cut are separated into the individual single fibers. They are then mixed, and released into a slit 5 by the centrifugal force and the air flow caused by the rotation of the rotor 4. Reference numeral 13 represents an opening for air supply. The released fibers 7 are pulled together with the air by a vacuum device 9 beneath a net 8 which is driven by a pair of rollers 6 and 6'. The fibers 7 are collected on the net 8 to form a mat 10. The mat is taken up by a take-up device 11. The mat may be taken up together with a protective paper or film 12 for the mat, if desired.

Method (2) is very suitable for preparing a mat of the present invention. Fibers which are comparatively long, for example, such as more than 10 mm, can be mixed uniformly using method (2).

There is no particular limitation on the weight of the mat. Generally, the mat produced has a basis weight of about 10 g/m$^2$ to about 1 kg/m$^2$. If the mat is too thin, it is difficult to handle because the fibers separate. This, however, depends upon the length of the fibers.

If the mat has poor handling properties, the contacting portions of the fibers may be bonded by a binder to increase the handling properties of the mat. Any binders which are used to produce non-woven fabrics, glass mats, paper, etc. can generally be used for this purpose. Examples of suitable binders are solutions or emulsions of polyvinyl alcohol, polyvinyl acetate, starch, cellulose acetate, and rubbers (e.g., neoprene rubber, chloroprene rubber, or isoprene rubber). Suitable solvents or emulsion carriers which can be used are those which have low boiling points, preferably about 30° C. to about 200° C., and do not adversely affect the fibers, such as water and acetone. Generally, such a solution or emulsion having a concentration of about 0.1 to about 5% by weight is applied to the fibers by impregnation or spraying to cause the binder to adhere to the fibers in as small an amount (dry weight) as possible, generally not more than about 10% by weight, preferably not more than about 5% by weight, based on the total weight of the fibers.

A composite material having relatively long reinforcing fibers uniformly dispersed therein can be obtained by consolidating the resulting mat under heat and pressure. Formation of the composite material can be performed in the same way as is generally used in fabrication of plastics. The temperature used for the production of the composite material is a temperature above the melting point of the thermoplastic fibrous matrix polymer but below the melting point of the reinforcing fibrous material. The molding pressure, which differs depending on the mixing ratio of the reinforcing fibrous material and the thermoplastic fibrous matrix polymer and the modulus of elasticity of the reinforcing fibrous material, usually ranges from about 5 kg/cm$^2$ to about 100 kg/cm$^2$. In order to obtain a molded article having a high density, the pressure is preferably applied until the product has the appearance of a solid. When the presence of voids inside the molded product is permissible, it is not necessary to apply the pressure until the molded product has the appearance of a solid. Generally, the pressure needs to be increased as the proportion of the reinforcing fibers in the molded product is increased. Two or more mats may be superimposed and consolidated under heat and pressure in accordance with this invention, if desired.

The method of this invention permits continuous molding of the mixed fibrous mat into a sheet form. Alternatively, the mixed mat may be placed in a mold and molded batchwise.

According to this invention, a thin mat in which the reinforcing fibrous material is mixed quite well with the fibrous matrix polymer can be obtained. It is possible to obtain a very thin sheet-like molded product having a basis weight of, for example, about 10 g/m$^2$. The mat of this invention can be formed into any desired shape such as a corrugated form, a cone, a dome and a tray as well as a flat plate. When the resulting composite material is intended for use in applications which do not require much deformation before or during molding (for example, as a flat plate or corrugated plate), the handling property of the mat may be enhanced by using a small amount of binder as stated hereinabove.

Thin molded articles can be produced from the mat of this invention. When microscopically viewed, the fibers are present at random and, as a whole, are uniformly distributed. Since the reinforcing fibers are randomly oriented throughout the molded articles they are strong in all directions and resist forces in all directions. Moreover, these molded articles are easy to process by cutting. Accordingly, speaker cones, structural materials (for example, architectural materials, linings of airplanes, and furniture), and machine component parts, for example, can be produced from the mat of this invention. Molded articles which are electrically conductive can be produced from a mat containing electrically conductive fibers such as carbon fibers. Furthermore, panel heaters may be produced from a mat containing carbon fibers.

The following Examples are given to illustrate the present invention in greater detail. Unless otherwise specified, all percentages, parts, ratios and the like are by weight.

The flexural modulus used in these examples was determined as follows;

A sample plate having a thickness of b and a width of a was placed on two linear fulcra separated at a distance of l (a is parallel to the fulcra and at right angles to l). A load W is exerted on the sample plate in its thickness direction at the center between the two fulcra to produce a flexure y in the sample plate. The flexural modulus E at this time is expressed by the following equation:

$$E = (1/4)(l^3 W/ab^3 y)$$

The tan δ is loss tangent. The loss tangent, tan δ = G''/G', is a useful parameter which is dimensionless and conveys no physical magnitude but is a measure of the ratio of energy lost to energy stored in cyclic deformation. [see *Encyclopedia of Polymer Science and Technology*, Vol. 14, p. 708, John Wiley & Sons, Inc. (1971)].

EXAMPLE 1

Figure 2:
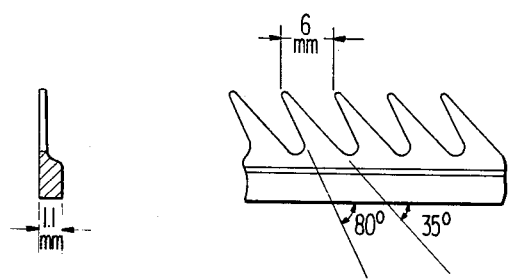
FIG. 2 shows the surface of the rotor of the apparatus in FIG. 1.

A lap having a width of 40 cm and a basis weight of 63 g/m$^2$ was obtained from staple fibers of a commercially available nylon-6 (melting point: about 217° C.; 3 denier; fiber length: 45 mm) using a carding machine. Then, together with the lap obtained, 40 bundles of continuous carbon fibers, each composed of 6,000 carbon fibers with a monofilament diameter of 7μ and an elasticity modulus of 23 t/mm$^2$ and having a weight per m of 0.41 g were arranged at intervals of 1 cm with a total width of 40 cm, and fed into a device in which method (2) described above could be conducted, as shown in FIG. 1. The speeds of the nylon fiber lap and the carbon fibers fed were both 1 m/min. The rotating speed of the rotor (the shape of needles on the surface of the rotor is shown in FIG. 2: 20 cm in diameter; number of needles: 15.15/cm$^2$) was 3,000 rpm, and the running speed of the collecting net was 1.04 m/min. A carbon fiber/nylon-6 mixed fibrous mat having a width of 40 cm and a basis weight of 100 g/m$^2$ and composed of 40% of the carbon fibers and 60% of the nylon-6 fibers was obtained. The mixed fibrous mat contained the two types of fibers in a uniformly mixed state, and the fibers did not separate from each other. The mat could be taken up on a 75 mm-diameter reel made of paper together with a protective paper, and exhibited good handling properties. The average cut length of the carbon fibers was 25 mm.

EXAMPLE 2

The carbon fiber/nylon-6 mixed fibrous mat obtained in Example 1 was cut into pieces each having a size of 200 mm × 200 mm. Twenty four such pieces were stacked and held between two metal plates having a spacer with a thickness of 2 mm, and mounted on a press heated at 250° C. The stacked pieces were compressed for 5 minutes at a pressure of 50 kg/mm$^2$, and cooled to below 100° C. while under compression. The resulting molded product had a thickness of 2 mm, a density of 1.30 g/cm$^3$, a flexural strength of 30.3 kg/mm$^2$, and a flexural modulus of 1.5 t/mm$^2$.

EXAMPLE 3

One sheet of the mat obtained in Example 1 was held between two flat metal plates, compressed for 3 minutes at a pressure of 20 kg/cm$^2$ and a temperature of 240° C., and cooled to below 100° C. while under compression. The resulting molded product had a thickness of 0.11 mm, a density of 0.90 g/cm$^3$ and a dynamic modulus of elasticity, measured with a Vibron DDS-II (a product of Toyo Sokki Kabushiki Kaisha) of 0.9 t/mm$^2$.

EXAMPLE 4

In each run, carbon fiber/nylon-6 fiber mixed mats each having the compositions shown in Table 1 below were produced in the same manner as in Example 1 except that the basis weight of the nylon-6 lap and the intervals between the carbon fiber bundles fed were changed. Molded articles having a thickness of 2 mm were produced from the resulting mats in the same manner as in Example 2. The properties of the resulting composite materials are also tabulated in Table 1 below.

TABLE 1

| | Composition of Mat | | Properties of Molded Articles | | |
|---|---|---|---|---|---|
| Run No. | Carbon Fibers (%) | Nylon-6 Fibers (%) | Density (g/cm$^3$) | Flexural Strength (kg/mm$^2$) | Flexural Modulus (t/mm$^2$) |
| 1 | 0 | 100 | 1.14 | 7.4 | 0.24 |
| 2 | 3 | 97 | 1.15 | 10.3 | 0.31 |
| 3 | 7 | 93 | 1.16 | 14.8 | 0.50 |
| 4 | 15 | 85 | 1.20 | 20.5 | 0.82 |
| 5 | 30 | 70 | 1.27 | 32.8 | 1.30 |
| 6 | 45 | 55 | 1.31 | 23.5 | 1.55 |
| 7 | 60 | 40 | 1.32 | 17.6 | 1.10 |

Note:
Run No. 1 was for comparison.

It can be clearly seen from the results in Table 1 above that the carbon fibers have no reinforcing effect if used in a proportion of less than 5%. On the other hand, if the proportion of the carbon fibers is more than 50%, filling of the spaces among the carbon fibers by the matrix polymer does not occur, and the resulting molded article has many voids. The strengths and the flexural moduli of the void-containing molded articles are lower than those of the products containing less than 50% by weight of carbon fibers.

EXAMPLE 5

A mixed mat having a basis weight of 150 g/m$^2$ and composed of 40% of carbon fibers and 60% of polyester fibers was produced in the same manner as in Example 1 using a lap of polyethylene terephthalate (melting point about 255° C.) fibers having a length of 4 cm and a single filament denier of 5 and bundles of continuous carbon fibers. The resulting mat was placed in a mold for production of speaker cones. The mat was compressed for 2 minutes at a temperature of 280° C. and a pressure of 15 kg/cm$^2$, and cooled to below 150° C. under compression to obtain a speaker cone having a diameter of 20 cm and a depth of 8.5 cm. The speaker cone had a uniform thickness, a weight of 4.7 g, a dynamic specific elasticity modulus (dynamic elasticity modulus/density), measured in the same manner as in Example 3, of $9.5 \times 10^{10}$ cm$^2$/sec$^2$, and a tan δ of 0.023.

An emulsion of a butadiene/acrylonitrile copolymer rubber was uniformly coated on the resulting speaker cone so that the amount of coating on drying was 2.0 g, and then dried. The dynamic specific elasticity modulus of the coated speaker cone decreased somewhat to $6.7 \times 10^{10}$ cm$^2$/sec$^2$, but the tan δ of the coated speaker cone increased to 0.072.

An audio test shown that both of these speaker cones produced sounds of good quality, and the butadiene/acrylonitrile copolymer rubber-coated speaker cone produced an especially superior quality sound.

EXAMPLE 6

Glass fibers (40%) cut to a length of 4 mm and having a diameter of about 10μ and an elasticity modulus of 7 t/mm$^2$ and polypropylene fibers having a melting point of about 170° C. (60%) cut to a length of 2 mm and having a single filament denier of 5 were dispersed in water in a fiber amount of 0.5%, and collected on a net. A 2% aqueous solution of polyvinyl alcohol as a binder was adhered to the fibers in an amount of 50% (1% solids) based on the fibers, and then dried to form a mat having a basis weight of 100 g/m$^2$.

The mat was cut into pieces each having a size of 200 mm×200 mm. Twenty-four such pieces were stacked, and held between two metal plates having a spacer with a thickness of 2.0 mm. The assembly was compressed for 10 minutes at a temperature of 200° C. and a pressure of 20 kg/cm$^2$, and cooled to below 100° C. under compression. The resulting molded product had a thickness of 2.0 mm, a density of 1.20 g/cm$^3$, a flexural strength of 15.5 kg/mm$^2$ and a flexural modulus of 0.52 t/mm$^2$.

A mixed fibrous mat of glass fibers and polypropylene fibers was produced in the same manner as in Example 6 except that glass fiber having a length of 15 mm was used instead of glass fiber having a length of 4 mm. Glass fiber did not disperse uniformly in water, therefore, a mixed fibrous mat in which two types of fibers being dispersed uniformly could not be obtained.

EXAMPLE 7

A mixed fibrous mat was produced in the same manner as in Example 1 except that a lap of polystyrene split fibers having a softening point of about 110° C. (average denier: 45 denier; average fiber length: 23 mm) was used instead of the nylon-6 lap. The mat was molded in the same manner as in Example 2. The resulting molded product had a density of 1.28 g/cm$^3$, a flexural strength of 21.5 kg/mm$^2$, and a flexural modulus of 1.7 t/mm$^2$.

When other materials were used as the reinforcing fibers and the matrix polymer, mixed fibrous mats and a fiber-reinforced composite material having a high modulus of elasticity could be produced in the same manner as in the above Examples.

While the invention has been described in detail and with reference to specific embodiments thereof, it will be apparent to one skilled in the art that various changes and modifications can be made therein without departing from the spirit and scope thereof.

What is claimed is:

1. A method for producing a uniformly mixed fibrous mat, comprising:
   (a) supplying to a rotating rotor which has projections on the surface thereof
      (i) at least one continuous high tensile modulus reinforcing fibrous material, with
      (ii) at least one pre-cut thermoplastic fibrous material,
      (iii) wherein said thermoplastic fibrous material has a lower melting or softening point than the temperature at which the reinforcing fibrous material melts or is damaged, and said reinforcing fibrous material has a lower ultimate elongation than the thermoplastic fibrous material,
      to thereby cut said continuous reinforcing fibrous material, and pluck said pre-cut thermoplastic fibrous material,
   (b) dispersing said reinforcing fibrous material and said thermoplastic fibrous material into an air flow in a slit by centrifugal force and by the air flow produced by the rotation of the rotor, to thereby mix said fibrous materials uniformly, (c) collecting the mixed fibrous materials together on a continuously moving net and applying a vacuum beneath the net to yield said uniformly mixed fibrous mat.

2. The method of claim 1, wherein the length of the pre-cut thermoplastic fibrous material is about 1 mm to about 100 mm.

3. The method of claim 1, wherein said projections are needles.

4. The method of claim 1, wherein the reinforcing fibrous material has a tensile modulus of at least about 5 t/mm$^2$.

5. The method of claim 1, wherein the reinforcing fibrous material is selected from the group consisting of carbon fibers, glass fibers, aluminum oxide fibers, silicon carbide fibers, boron fibers, stainless steel fibers, aromatic polyamide fibers or a mixture thereof.

6. The method of claim 1, wherein the thermoplastic fibrous matrix polymer is selected from the group consisting of a nylon, a polyester, a polypropylene, a polyethylene, a polystyrene or a mixture thereof.

7. The method of claim 1, wherein the fiber lengths of the reinforcing fibrous material and the thermoplastic fibrous material in the mat range from about 1 mm to about 100 mm, and at least one of the reinforcing fibrous material and the thermoplastic fibrous material in the mat has a fiber length of at least about 5 mm.

8. The method of claim 1, wherein the proportion of the reinforcing fibrous material in the mat is about 1 to 60% by weight, and the proportion of the thermoplastic fibrous material in the mat is about 99 to 40% by weight.

9. The method of claim 1, wherein the reinforcing fibrous material is carbon fibers, and the thermoplastic fibrous material is selected from the group consisting of a nylon, polyethylene terephthalate, a polystyrene or a mixture thereof.

10. A fibrous mat obtained by the method as claimed in claim 1.

11. The method of claim 1, wherein said pre-cut thermoplastic fibrous material is supplied to the rotor as a lap.

12. The method of claim 1, wherein said pre-cut thermoplastic fibrous material is supplied to the rotor as slivers.

13. The method of claim 1, wherein said pre-cut thermoplastic fibrous material is dispersed by the centrifugal force and the air flow caused by the rotation of the rotor.

14. The method of claim 1, wherein said at least one pre-cut thermoplastic material has said lower melting point.

15. The method of claim 1, wherein said at least one pre-cut thermoplastic material has said lower softening point.

16. A method for producing a fiber reinforced composite material having a high modulus of elasticity, comprising:

(a) supplying to a rotating rotor which has projections on the surface thereof
  (i) at least one continuous high tensile modulus reinforcing fibrous material, with
  (ii) at least one pre-cut thermoplastic fibrous material
  (iii) wherein said thermoplastic fibrous material has a lower melting or softening point than the temperature at which the reinforcing fibrous material melts or is damaged, and said reinforcing fibrous material has a lower ultimate elongation than the thermoplastic fibrous material, to thereby cut said continuous reinforcing fibrous material and pluck said pre-cut thermoplastic fibrous material, (b) dispersing said reinforcing fibrous material and said thermoplastic fibrous material into an air flow in a slit by centrifugal force and by the air flow produced by the rotation of the rotor, to thereby mix said fibrous materials uniformly, (c) collecting the mixed fibrous materials together on a continuously moving net and applying a vacuum beneath the net to yield a sheet of a uniformly mixed fibrous mat, (d) compressing under heat at least one sheet of the thus-obtained mat to melt only the thermoplastic fibrous material, and (e) cooling the thus obtained product to thereby consolidate said product to provide a fiber reinforced composite material.

17. The method of claim 16, wherein the continuous reinforcing fibrous material has a tensile modulus of at least about 5 t/mm$^2$.

18. The method of claim 16, wherein the reinforcing fibrous material is selected from the group consisting of carbon fibers, glass fibers, aluminum oxide fibers, silicon carbide fibers, boron fibers, stainless steel fibers, aromatic polyamide fibers, or a mixture thereof.

19. The method of claim 16, wherein the thermoplastic fibrous matrix polymer is selected from the group consisting of a nylon, a polyester, a polypropylene, a polyethylene, a polystyrene, or a mixture thereof.

20. The method of claim 16, wherein the fiber length of the reinforcing fibrous material and the thermoplastic fibrous material in the mat range from about 1 mm to about 100 mm, and at least one of the reinforcing fibrous material and the thermoplastic fibrous material has a fiber length of at least about 5 mm.

21. The method of claim 16, wherein the proportion of the reinforcing fibrous material in the mat is about 1 to about 60% by weight, and the proportion of the thermoplastic fibrous material is about 99 to 40% by weight.

22. The method of claim 16, wherein the continuous reinforcing fibrous material is carbon fibers and the pre-cut thermoplastic fibrous material is selected from the group consisting of a nylon, polyethylene terephthalate, a polystyrene, or a mixture thereof.

23. The method of claim 16, wherein the compressing is at a pressure of about 5 to about 100 kg/cm$^2$.

24. The method of claim 16, wherein the method includes stacking at least two mixed fibrous mats to form an assembly and compressing the assembly under heat.

25. The method of claim 16, wherein said at least one pre-cut thermoplastic material has said lower melting point.

26. The method of claim 16, wherein said at least one pre-cut thermoplastic material has said lower softening point.

* * * * *